C. C. FEAST.
WHEEL HOLDING APPARATUS.
APPLICATION FILED MAY 4, 1918.
1,326,188.
Patented Dec. 30, 1919.
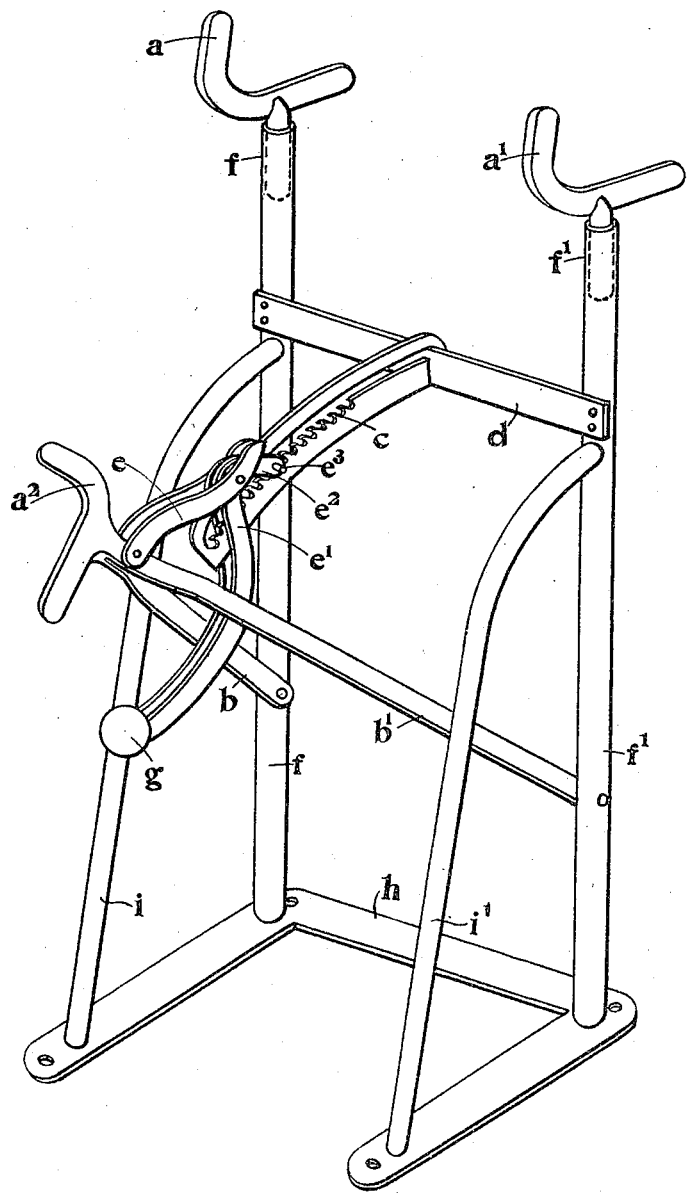
Inventor
C.C. Feast
by
W. E. Evans
Attorney.

UNITED STATES PATENT OFFICE.

CHRISTOPHER CHARLES FEAST, OF LEIGH-ON-SEA, ENGLAND.

WHEEL-HOLDING APPARATUS.

1,326,188.  Specification of Letters Patent.  Patented Dec. 30, 1919.

Application filed May 4, 1918. Serial No. 232,581.

*To all whom it may concern:*

Be it known that I, CHRISTOPHER CHARLES FEAST, a subject of the King of Great Britain and Ireland, residing at "Albury," Leighcliff Road, Leigh-on-Sea, Essex, England, have invented a certain new and useful Wheel-Holding Apparatus, of which the following is a specification.

This invention relates to an apparatus or stand adapted firmly to hold the wheels or wheel rims of automobiles and other vehicles, in a position convenient for readily removing or fitting the tire, for repairing the wheel or rim or for effecting repairs thereon.

According to the invention a number of wheel or rim holding members are mounted upon a frame in such positions as to support and to hold the rim at a number of points on its inner circumference, and at least one of the wheel or rim holding members is adapted to have a movement to permit of the rim being mounted in position upon the holding members and of such pressure being applied against the rim as to insure its being firmly held thereby.

The wheel or rim holding members conveniently have a substantially L shape, so that thus the holding members serve to support the wheel or rim, and to hold or to grip it in the manner described; while furthermore the rim or wheel holding members are pivotally mounted so that the upstanding parts thereof accommodate themselves according to various patterns of wheels or wheel rims.

Any suitable mechanical means may be employed to effect the movement of the movable wheel or rim holding member, but the invention comprises the means hereinafter described and illustrated in the accompanying drawing, which represents a perspective view of one form of wheel holding stand constructed according to the invention.

In the drawing three L shaped rim holding members $a$, $a^1$, $a^2$, are provided, each consisting of an upstanding part adapted to engage the inner circumference of the wheel rim, and an outwardly extending part adapted to support the wheel rim, when the rim or wheel is applied thereon. The members $a$, $a^1$, are provided with integral pivot stems or shanks, adapted to be mounted within the upper ends of the vertical tubular frame members $f$, $f^1$, while the member $a^2$ is provided integral with a V shaped frame $b$ $b^1$ whose outwardly extending ends are pivotally mounted on the frame members $f$ $f^1$, in such manner that inward or outward movement of the member $a^2$ is permitted for mounting the rim in position upon the stand, and for releasing it, the extent of movement being determined according to the varying sizes and patterns of wheel rims.

The vertical members $f$ $f^1$ are mounted upon a base $h$, and struts $i$ $i^1$ may be employed to support the vertical members $f$ $f^1$, from the outwardly extending parts of the base $h$. A transverse flexible steel bar $d$ is provided to connect the vertical members $f$ $f^1$ near their upper ends, and the bar $d$ may serve firmly to carry the slotted toothed rack $c$. The teeth of the rack $c$ are provided of a form corresponding to the pin or member $e^3$ provided to engage therewith, the spaces between the teeth in the illustrated construction being formed with a curvature to accommodate the pin $e^3$. The pin $e^3$ is transversely mounted at the end of a double lever $e^1$ formed of parts of a symmetrical shape united at their ends by means of a handle $g$. The double lever has its upper end of curved shape and its respective symmetrical parts are pivoted at the curved portion (near the end at which the pin $e^3$ is provided) to the links $e$ whose opposite ends are connected to the outer end of the frame $b$ $b^1$.

It will thus be understood that one of the symmetrical parts of the lever $e^1$ is provided upon each side of the slotted rack $c$, and that one of the links $e$ is provided on each side of the lever $e^1$ and is connected to one of its parts.

In operation the wheel rim is placed upon the holding members $a$ $a^1$, so that the rim at its inner circumference engages in the curved angular part thereof. The upstanding part of the third member $a^2$ is brought as close as possible to the inner circumference of the wheel rim, by lifting the handle $g$, and sliding the pin $e^3$ into the nearest convenient interstitial space between the teeth of the rack $c$. The wheel rim thus resting upon the outwardly extending parts of the members $a$, $a^1$, $a^2$, the handle $g$ is given a downward movement, whereby the upstanding part of the member $a^2$ applies further pressure to the rim against the upstanding parts of the members $a$ $a^1$. The wheel rim is thus held elastically by reason of the connection of the rack $c$ and toggle mechanism, to the flexible steel bar $d$.

It will be understood that the members $a$ $a^1$, may be mounted upon any convenient frame, that more than three rim holding members may be provided, and that more than one movable rim holding member such as $a^2$ may be used. The frame members $f$ $f^1$ and the members $b$ $b^1$, may be provided of such length that the wheel or rim may be disposed in an inclined position on the parts $a$, $a^1$, $a^2$, convenient for manipulation by a person standing in front of the apparatus.

Instead of the toggle lever mechanism illustrated any other toggle lever mechanism may be used, or any equivalent such as a screwed spindle, adjustable struts or quadrants.

I claim:

1. A wheel holding apparatus for holding a wheel rim upon its side, comprising rim holding members adapted to support the rim and to engage the rim on its inner circumference, one of the said rim holding members being movable while the others are held stationary, a pivoted frame upon which the movable rim holding member is carried and means for separating the movable rim holding member from the stationary rim holding members and thereby to apply pressure upon the inner circumference of the wheel rim, substantially as described.

2. A wheel holding apparatus for holding a wheel rim upon its side, comprising rim holding members adapted to support the rim and to engage the rim on its inner circumference, one of the said rim holding members being movable while the others are held stationary, a pivoted frame upon which the movable rim holding member is carried and means consisting of a toggle lever device for separating the movable rim holding member from the stationary rim holding members and thereby to apply pressure upon the inner circumference of the wheel rim, substantially as described.

3. A wheel holding apparatus for holding a wheel rim upon its side, comprising rim holding members adapted to support the rim and to engage the rim on its inner circumference, one of the said rim holding members being movable while the others are held stationary, a pivoted frame upon which the movable rim holding member is carried and means consisting of a toggle lever device for separating the movable rim holding member from the stationary rim holding members and thereby to apply pressure upon the inner circumference of the wheel rim, the said toggle lever device being connected to a flexible bar, substantially as described.

4. A wheel holding apparatus for holding a wheel rim upon its side, comprising rim holding members adapted to support the rim and to engage the rim on its inner circumference, one of the said rim holding members being movable while the others are held stationary, a pivoted frame upon which the movable rim holding member is carried and means for separating the movable rim holding member from the stationary rim holding members and thereby to apply pressure upon the inner circumference of the wheel rim, consisting of a fixed slotted member having a series of teeth on the lower edge of the slot, a toggle lever having a member adapted to be inserted in the spaces between the said teeth, said lever being carried by links connected to the said movable rim holding member, substantially as described.

CHRISTOPHER CHARLES FEAST.